United States Patent
Singh et al.

(10) Patent No.: US 9,544,875 B1
(45) Date of Patent: Jan. 10, 2017

(54) METHOD AND SYSTEM FOR DIFFERENTIATED PAGING CHANNEL SELECTION

(71) Applicant: Sprint Spectrum L.P., Overland Park, KS (US)

(72) Inventors: Jasinder P. Singh, Olathe, KS (US); Sachin R. Vargantwar, Macon, GA (US); Bhagwan Khanka, Bothell, WA (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 385 days.

(21) Appl. No.: 14/089,137

(22) Filed: Nov. 25, 2013

Related U.S. Application Data (63) Continuation of application No. 12/567,198, filed on Sep. 25, 2009, now Pat. No. 8,626,203.

(51) Int. Cl.
*H04W 68/00* (2009.01)
*H04W 68/02* (2009.01)
*H04W 36/00* (2009.01)

(52) U.S. Cl.
CPC ......... *H04W 68/02* (2013.01); *H04W 36/0055* (2013.01)

(58) Field of Classification Search
CPC .... H04W 68/00; H04W 68/02; H04W 68/025; H04W 68/06; H04W 68/08; H04W 68/005; H04W 36/0055
USPC ............... 455/426.1, 458, 515, 435.1, 435.2, 450,455/451, 452.1, 455
See application file for complete search history.

(56) References Cited

U.S. PATENT DOCUMENTS

| | | |
|---|---|---|
| 6,101,394 A | 8/2000 | Illidge |
| 6,603,750 B1 | 8/2003 | Lindskog et al. |
| 6,904,012 B1 | 6/2005 | Kim et al. |
| 8,254,967 B1 | 8/2012 | Singh et al. |
| 2003/0036384 A1* | 2/2003 | Chen ................ H04W 36/0027 455/437 |
| 2005/0201321 A1 | 9/2005 | Sinnarajah et al. |
| 2007/0140186 A1* | 6/2007 | Picot .................... H04W 48/04 370/338 |

(Continued)

OTHER PUBLICATIONS

TR45, "Upper Layer (Layer 3) Signaling Standard for cdma2000 Spread Spectrum Systems," PN-4431 to be published as TIA/EIA/IS-2000-5, Ballot Resolution Version 1.04a, Jul. 11, 1999.

*Primary Examiner* — Thai Vu (57) ABSTRACT

Disclosed is a method and system to manage paging channels in a wireless communication network. When the network encounters a situation where the network is to transmit an access response message in a coverage area to a mobile station, the network will determine whether the mobile station is in an access handoff state. If not, the network will transmit the message to the mobile station on a paging channel selected based on the mobile station's identifier. Otherwise, the network will transmit the message to the mobile station on both that paging channel and a default paging channel (e.g., primary channel) selected without consideration of the mobile station's identifier. This process can help avoid an access handoff failure. Further, a radio access network may opt to use the default paging channel in response to the wireless coverage area having a different number of paging channels than an adjacent coverage area.

8 Claims, 8 Drawing Sheets

(56) References Cited

U.S. PATENT DOCUMENTS

2010/0203906 A1\* 8/2010 Fang .................. H04W 68/025
　　　　　　　　　　　　　　　　　　　　455/458

\* cited by examiner

METHOD AND SYSTEM FOR DIFFERENTIATED PAGING CHANNEL SELECTION

BACKGROUND

In a typical cellular wireless communication system, an area is divided geographically into a number of wireless coverage areas (e.g., cells and cell sectors), each defined by a radio frequency (RF) radiation pattern from a respective base station. One or more base stations of the system may then be coupled with other network infrastructure, such as a base station controller, switch, and/or gateway, which may control aspects of base station operation and may provide connectivity with one or more transport networks such as the Public Switched Telephone Network and/or the Internet for instance. When a mobile station, such as a cellular telephone, personal digital assistant, pager, or appropriately equipped computer, for instance, is positioned in a wireless coverage area, the mobile station may then communicate via an RF air interface with the serving base station and thereby establish communication with other served mobile stations or with entities on one or more connected transport networks.

In general, the air interface in each wireless coverage area of such a system is divided into a number of channels for carrying bearer traffic (e.g., voice and other user data) and control data between the base station and served mobile stations. The channels that carry data from the base station to served mobile stations are considered "forward link" channels, and the channels that carry data from served mobile stations to the base station are considered "reverse link" channels. Depending on the wireless technology used, the air interface can be divided into these channels through code division multiplexing (with each channel defined by modulation with a specific code), time division multiplexing (with each channel defined as a segment of time), frequency division multiplexing (with each channel defined by modulation with a specific frequency), and/or some other mechanism.

In terms of control channels, the forward link of each wireless coverage area may define one or more overhead channels through which the base station may generally broadcast system parameter information for use by served mobile stations, and the forward link may further define one or more paging channels through which the base station may transmit control channel messages typically targeted to specific mobile stations. In turn, the reverse link of each wireless coverage area may define one or more access channels through which served mobile stations can transmit to the base station requests to initiate calls (e.g., voice calls or data communication sessions) and responses to control channel messages received from the base station.

The wireless coverage areas (e.g., cell sectors) in a typical system may be grouped into paging zones to help the system determine where to page a mobile station. An overhead message broadcast in each coverage area may specify the coverage area's paging zone, so that served mobile stations can detect when they move from one paging zone to another. In practice, when a mobile station initially powers on in a given coverage area, the mobile station may register with the network by transmitting a registration message via an access channel to the network, so that the network will know the paging zone in which the mobile station is located. In turn, when the mobile station moves into a new paging zone, the mobile station may then newly register with the network, to notify the network of the mobile station's new paging zone. When the network seeks to page the mobile station, the network may then transmit the page message in all coverage areas of the mobile station's zone of last registration, and perhaps in adjacent zones to account for the possibility that the mobile station has moved to a new zone without yet re-registering.

On the other hand, when a mobile station initiates a communication by transmitting an access probe to the network via the access channel in a given coverage area, the network may respond to that access probe by transmitting a response message to the mobile station on a paging channel in the same coverage area. For instance, to initiate a call when operating in a given coverage area, a mobile station may transmit on an access channel of that coverage area an access probe that defines a call origination request message. Upon receipt of that access probe, the network may then carry out various call setup functions and may transmit to the mobile station on a paging channel of the coverage area a channel-assignment message that directs the mobile station to use a particular air interface traffic channel to engage in the requested call, so that call may then begin.

If the coverage area on which the network receives a request message (e.g., call origination message) from a mobile station borders one or more other coverage areas as is typical, the network may transmit a response to the mobile station not only in the coverage area in which the mobile station transmitted the request but also in each adjacent coverage area, to account for the possibility that the mobile station has moved to another coverage area in the interim.

In a system where a wireless coverage defines more than one paging channel, a mechanism is typically provided for selecting a paging channel to use for paging particular mobile stations, preferably in a manner that evenly or at least randomly distributes paging channel load among the various mobile stations the coverage area at any given time. One way to accomplish this is through use of a hashing algorithm keyed to mobile station identifier. The hashing algorithm may take the form of a probability function that, when applied to a given mobile station's identifier, will produce an index value that can be applied to a list of paging channels to indicate which paging channel should be used for that mobile station.

For instance, the hashing algorithm applied to the mobile station's identifier may produce a value from 0 to 1. Assuming, by way of example, that there are four sequentially numbered paging channels in the coverage area, a resulting value of 0 to 0.25 may then indicate that paging channel number 1 should be used, a resulting value of 0.26 to 0.50 may indicate that paging channel number 2 should be used, a resulting value of 0.51 to 0.75 may indicate that paging channel number 3 should be used, and a resulting value of 0.76 to 1.00 may indicate that paging channel number 4 should be used. Of course, the number of paging channels may differ from this, the manner in which the hash result would be applied to determine which paging channel to use for the mobile station at issue may differ as well, and the hash function itself may take any of a variety of forms.

When a network pages a mobile station in a given coverage area that has more than one paging channel, the base station may apply the established hashing algorithm keyed to the mobile station's identifier to determine which paging channel to use for transmission of the page message to the mobile station. Likewise, the mobile station may apply the same hashing algorithm keyed to the mobile station's identifier to determine which paging channel to monitor for receipt of a page message destined to the mobile station.

An overhead channel message (e.g., system-parameters message) that is broadcast in each coverage area may specify how many paging channels exist in the coverage area and may expressly or inherently define the paging channels to facilitate this process. Depending on the air interface protocol in use, for example, there may be a series of possible paging channels, and the overhead channel message may simply specify how many paging channels are defined for the coverage area, thus inherently indicating that the indicated number of paging channels beginning from the start of the sequence are in use.

In an example Code Division Multiple Access (CDMA) system, for instance, up to seven paging channels may be defined by spread spectrum modulation using, respectively, "Walsh codes" 1 through 7. If the overhead channel message indicates that the coverage area has just one paging channel, for instance, that would constitute an inherent indication that the coverage area has just paging channel #1, using Walsh code 1. Whereas, if the overhead channel message indicates that the coverage area has, say, three paging channels, then that would constitute an inherent indication that the coverage area has paging channels #1, #2, and #3, using Walsh codes 1, 2, and 3 respectively.

In this arrangement, or in analogous arrangements under other types of air interface protocols, one paging channel may be considered a "primary" paging channel, typically because at least that paging channel would be used in all (or substantially all) of the coverage areas in the system. Thus, each coverage area would employ the primary paging channel, and some or all of the coverage areas may also employ one or more additional paging channels. The primary paging channel may be defined with respect to a sequence of possible paging channels (e.g., as the first channel of the sequence or the last of the sequence), as in the CDMA example above for instance, or in any other manner.

OVERVIEW

When a mobile station moves from one coverage area into a coverage area that has greater than one paging channel, the mobile station will generally apply the established hashing algorithm in order to determine which paging channel in the new coverage area the mobile station should monitor for any page messages destined to the mobile station. Unfortunately, however, in the time that it takes the mobile station to fully "hash onto" a paging channel in the new coverage area (including the time that it takes the mobile station to learn from an overhead channel message how many paging channels there are in the new coverage area, and the time that it takes the mobile station to apply the established hashing algorithm to determine which paging channel to monitor in the new coverage area), it is possible that the mobile station may miss a page message transmitted to the mobile station in the new coverage area. This can be a particular problem if the mobile station is in an "access handoff" state, where the mobile station sent an access probe in one coverage area and is awaiting receipt of a response to the access probe when the mobile station enters the new coverage area, since the mobile station may not receive the response message in the new coverage area if the mobile station is busy hashing onto a paging channel in the new coverage area. Specifically if the access probe was a call origination message, the result of this situation could be that a call attempt by the mobile station may fail, which may result in poor user experience.

One existing mechanism that is known to help to avoid this problem is for the network to broadcast in a given coverage area an indication for each neighboring coverage area of whether the neighboring coverage area has the same number of paging channels as the given coverage area, and for a mobile station to use that indication as a basis to decide whether stay on the same paging channel that the mobile station was on the given coverage area when it moves into an adjacent coverage area. For instance, in given coverage area, the network may broadcast or otherwise provide to served mobile stations a "neighbor list" that lists adjacent coverage areas, primarily to allow the mobile stations to scan for possible coverage of the adjacent coverage areas, and to facilitate handoff. Such a neighbor list may specify (e.g., with a Boolean flag) for each listed neighboring coverage area whether or not the coverage area has the same number of paging channels as the given coverage area. When a mobile station moves into a neighboring coverage area, the mobile station may then have advanced knowledge of whether the neighboring coverage area has the same number paging channels as the given coverage area.

According to this known mechanism, if the indication is that the neighboring coverage area has the same number of paging channels as the given coverage area, then, when the mobile station moves to the neighboring coverage area, the mobile station may simply and automatically stay on the same number paging channel that the mobile station was monitoring in the given coverage area, which would be the same channel that the mobile station would hash onto in any event. In this situation, the network may apply the established hashing algorithm as normal to determine which paging channel to use for paging the mobile station in the neighboring coverage area, and the result should be the same channel that the mobile station monitors, since the number of paging channels in the neighboring coverage area is the same as the number of paging channels in the given coverage area (where the hashing algorithm may have been likewise applied).

On the other hand, if the neighboring coverage area has a different number of paging channels than the given coverage area, then, when the mobile station moves to the neighboring coverage area, the mobile station may apply the established hashing algorithm to determine which paging channel in the neighboring coverage area the mobile station should use. And again conventionally, the network may also apply the hashing algorithm to determine which paging channel to use for paging the mobile station, and the result should match that obtained by the mobile station.

Even with this known process, however, the mobile will still need to hash onto a paging channel in the neighboring coverage area if the neighboring coverage area has a different number of paging channels than the given coverage area. Therefore, in that scenario, there is still a chance that the mobile station may miss a page message (e.g., an access-response message) that is sent to the mobile station in the neighboring coverage area while the mobile station is busy hashing onto the appropriate paging channel in the neighboring coverage area.

Disclosed herein is a method, and correspondingly programmed apparatus, to help overcome this problem. In accordance with the method, when a mobile station moves (or is moving or about to move) from a given coverage area to a neighboring coverage area, if the numbers of paging channels in the two coverage areas differ, then the mobile station will automatically select a default paging channel other than the paging channel that would result from applying the established hashing algorithm. The default paging channel in this process may be the primary paging channel (e.g., Walsh code 1, in an example CDMA system), but it can be predefined in some other manner. Further, the network (e.g., a base station) will apply an analogous process to also select the default paging channel for any page message that the network sends to the mobile station in the neighboring coverage area.

This method applies particularly when the neighboring coverage area has more than one paging channel, since, if the neighboring coverage area had just one paging channel that paging channel would of course be the one that the mobile station would select. In a scenario where the neighboring coverage area has a number of paging channels that is greater than one and that is different than the number of paging channels in the given coverage area (from which the mobile station is moving), the present method advantageously avoids the need for the mobile station to go through the hashing process upon movement into the neighboring coverage area, as the mobile station will instead simply select the default paging channel by rote.

Further, the method can apply particularly when the default paging channel in the neighboring coverage area is different than the paging channel that the mobile station would hash onto in the neighboring coverage area if the mobile station were to apply the established hashing algorithm. On the other hand, the method is also applicable in a more general sense with the mobile station selecting the default paging channel in the neighboring coverage area simply without applying the hashing algorithm and without considering an identifier of the mobile station, even if the default paging channel would be the same as the paging channel that the mobile station would select if the mobile station were to apply the hashing algorithm. The advantage would be, in any event, that the mobile station would select a paging channel without the need to go through the hashing function, and thus the mobile station should not miss a page message due to being busy hashing.

To support implementation of this method, the network may also be arranged to operate in a corresponding manner. For instance, if the network is going to page the mobile station in a given coverage area and also seeks to page the mobile station in a neighboring coverage area out of caution that the mobile station might have moved to the neighboring coverage area, and if the neighboring coverage area has a number of paging channels that is greater than one and that is different than the number of paging channels in the given coverage area, then the network may simply page the mobile station on the default paging channel in the neighboring coverage area. Again in this scenario, the default paging channel would be a paging channel other than the paging channel that would be dictated by the established hashing algorithm.

The present method is especially useful when the mobile station is in an access handoff state. In that situation, the network would have received an access request transmitted by the mobile station in the given coverage area and the network would transmit a response message both in the given coverage area and in the neighboring coverage area, out of caution for the possibility that the mobile station had moved to the neighboring coverage area in the interim. In such a situation, the present method provides the advantage that the mobile station need not go through the hashing process when entering into the neighboring coverage area. The mobile station may simply monitor the default paging channel upon moving into the neighboring coverage area. Further, when the network has received an access request message from the mobile station in a given coverage area and the network is going to send an access response message to the mobile station in a neighboring coverage area, the network may correspondingly automatically transmit the access response message on the default paging channel in the neighboring coverage area.

By using the default paging channel for transmission/receipt of an access response message in the neighboring coverage area, the method may thus help to avoid a situation where the mobile station is busy hashing onto a paging channel (or has not yet selected a paging channel) in the neighboring coverage area and consequently fails to receive an access response message transmitted in the neighboring coverage area. Therefore, the method may help to avoid access handoff failure.

In practice, however, if the mobile station will automatically monitor the default paging channel upon moving into a neighboring coverage area and the network will automatically transmit page messages to the mobile station on the default paging channel when the mobile station moves into the neighboring coverage area (or to safeguard for the possibility that the mobile station has moved into the neighboring coverage area), at least two additional issues arise. First, by automatically using the default paging channel rather than the paging channel dictated by the hashing algorithm, the overall paging channel load may be more heavily weighted on the default paging channel, defeating the load-balancing goal of the hashing process. Second, the method would seem to require the network to know whether a given mobile station is applying the method and particularly whether a given mobile station is currently monitoring the default paging channel rather than the paging channel dictated by the hashing algorithm.

To help overcome these additional issues, the method may be refined in two respects. First, although the mobile station may decide through the above process to monitor the default paging channel upon moving into a neighboring coverage area, the mobile station may be set to do so for just a limited period of time and to then automatically switch over to monitor the paging channel dictated by the hashing algorithm. Preferably, the period of time for which the mobile station monitors the default paging channel would be sufficient to allow the mobile station to receive and process a response to an access request message that the mobile station sent to the network before moving into the neighboring coverage area, if the mobile station is in an access handoff state. As such, the period of time may be predefined by engineering design to be sufficient for at least this purpose. Alternatively, the mobile station may simply monitor the default paging channel until the mobile station actually receives a response to an access request message that the mobile station sent before moving into the neighboring coverage area, and the mobile station may then switch over to monitor the paging channel dictated by the hashing algorithm.

Correspondingly, when the network has received an access request message from the mobile station in a given coverage area and the network is going to send an access response message to the mobile station in a neighboring coverage area, as noted above the network may automatically transmit the access response message on the default paging channel in the neighboring coverage area. After doing so, the network may then automatically switch over to use the paging channel dictated by the hashing algorithm for transmitting any further page messages to the mobile station in the neighboring coverage area.

Second, given that the network may not know whether the mobile station is in fact applying the method and whether the mobile station is currently monitoring the default paging channel rather the paging channel dictated by the hashing algorithm, the method may be additionally refined to have the network page the mobile station concurrently on both the default paging channel and the paging channel dictated by the hashing algorithm. Thus, when the network has received an access request message from the mobile station in a given coverage area and the network is going to send an access response message to the mobile station in a neighboring coverage area, the network may automatically transmit the access response message on both the default paging channel in the neighboring coverage area and the paging channel dictated by the hashing algorithm in the neighboring coverage area. That way, absent other issues, the mobile station should receive the access response message regardless of whether the mobile station is monitoring the default paging channel or the channel dictated by the hashing algorithm.

In a preferred implementation, the network may limit application of this refined method to scenario where the mobile station is likely in an access handoff state. To do so, when the network is going to transmit an access response message to a mobile station in a particular coverage area, the network may determine whether the access response message is a response to an access request message that the network received in the same coverage area. If so, then the network may conclude that the access response message is not being sent in an access handoff scenario, since, if the mobile station is still in the coverage area where the mobile station sent the access request message, the mobile station would already be monitoring the paging channel dictated by the hashing algorithm in that coverage area. Thus, in that scenario, the network may simply transmit the access response message to the mobile station on the paging channel dictated by the hashing algorithm. On the other hand, if the network determines that the access response message being transmitted in a particular coverage area is a response to an access request message that the network received in another coverage area, then the network may conclude that the access response message is being sent in an access handoff scenario. In that case, the network may then transmit the access response message concurrently (i.e., at the same time or substantially the same time) on both the default paging channel and the paging channel dictated by the hashing algorithm.

In practice, these refined network functions can be implemented by a base station in the network. In particular, if and when the base station receives from a mobile station an access request message in a coverage area (e.g., a specific cell sector), the base station may record that fact. In turn, when the base station encounters a need to transmit an access response message to the mobile station in particular coverage area (e.g., where the response message is generated by the base station or is provided to the base station by other network infrastructure such as a base station controller or switch), the base station may determine whether the base station had received in the particular coverage area the access request message to which the response is a response. If so, then the base station may conclude that the response message is not being sent in an access handoff scenario, and the base station may therefore transmit the response message in the particular coverage area on the paging channel dictated by the hashing algorithm. On the other hand, if the base station determines that the base station had received in the particular coverage area the access request message to which the response is a response, then the base station may conclude that the response message is being sent in an access handoff scenario, and so the base station may transmit the response message in the particular coverage area on both the default paging channel and the paging channel dictated by the hashing algorithm.

DETAILED DESCRIPTION

The present method will now be described with reference to the figures. It should be understood, however, that numerous variations from the arrangement and functions shown are possible while remaining within the scope and spirit of the claims. For instance, elements may be added, removed, combined, distributed, substituted, re-positioned, re-ordered, or otherwise changed. Further, where this description refers to functions being carried out by an entity such as a mobile station or a base station (or other network component), it will be understood that the entity can carry out the functions by itself or with the assistance of other entities, and through application of hardware, firmware and/or software logic. For instance, the entity may include a processor programmed with instructions to implement the functions described. Still further, it should be understood that all of the discussion above is considered part of this detailed disclosure.

Referring to the drawings, as noted above, FIG. 1 is a simplified block diagram of a cellular wireless communication system in which the present method can be implemented. The system includes at its core a radio access network (RAN) 12 that functions to provide served mobile stations with communication service, such as access to one or more transport networks 14 for instance. As shown, the example RAN 12 includes one or more base stations (BSs) 16, one or more base station controllers (BSCs) 18, and one or more switches/gateways 20 providing connectivity with transport networks 14. A suitable RAN can take other forms as well, ranging in degree of complexity and scope of operation.

Figure 1:
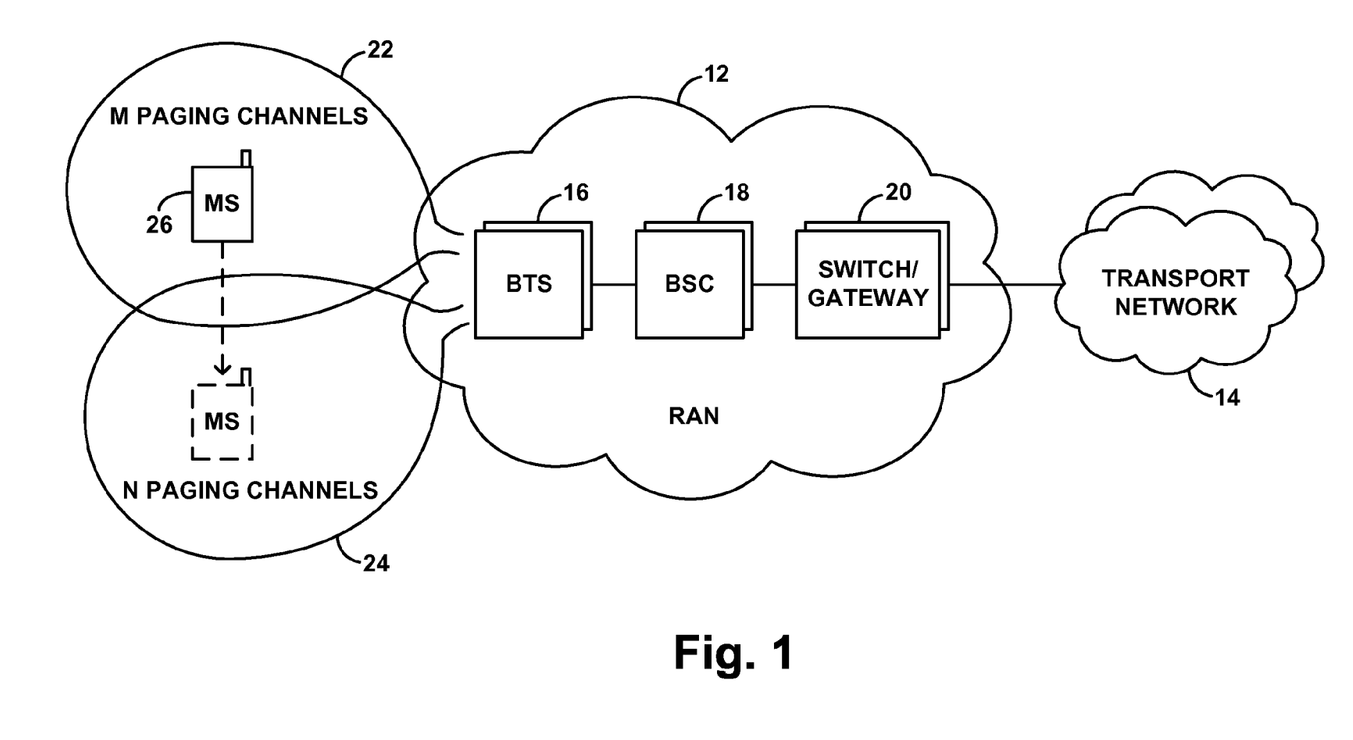
FIG. 1 is a simplified block diagram of a cellular wireless communication system in which an exemplary embodiment of the present method can be implemented.

Each base station preferably includes one or more antenna arrangements and associated equipment for radiating to define one or more wireless coverage areas, such as cell sectors for instance, in which mobile stations may operate. FIG. 1 depicts two representative coverage areas 22, 24 by way of example. These two coverage areas may emanate from a common base station or may emanate from separate base stations. In each coverage area, communications between the serving base station and served mobile stations may be compliant with one or more air interface protocols, example of which include CDMA (e.g., 1xRTT, 1xEV-DO), iDEN, WiMAX (e.g., IEEE 802.16), LTE, TDMA, AMPS, GSM, GPRS, UMTS, or EDGE, WI-FI (e.g., IEEE 802.11), BLUETOOTH, and others now known or later developed.

Shown operating in coverage area 22 and moving from coverage area 22 to coverage area 24 is an example mobile station 26, operable to be served by RAN 12. Mobile station 26 may be a cellular telephone, wirelessly equipped personal digital assistant or personal computer, or other wirelessly equipped device. Although the term "mobile station" is used by convention to describe such a device, it is understood that the device need not actually be movable. Mobile station 26 could in theory be fixed in position. In that case, the "movement" of mobile station 26 from coverage area 22 to coverage area 24 could be an idle or active handoff of mobile station 26 resulting from change in the relative air interface conditions of the two coverage areas or from other factors beyond mere physical movement of the device itself. Preferably, mobile station 26 has a unique identifier such as a mobile identification number (MIN), mobile directory number (MDN), international mobile subscriber identifier (IMSI), or the like, which can be used as a basis to target page messages to the mobile station and for other purposes.

In general, as discussed above, each coverage area 22, 24 defines a number of paging channels through which the RAN can transmit page messages targeted to specific mobile stations. Specifics of how these paging channels are defined will vary depending on air interface protocol will be understood by both the RAN and the served mobile stations so that the RAN can transmit a page message to a specific mobile station and the mobile station can receive and process the page message.

As one example, each paging channel may define periodically recurring timeslots for carrying page messages. When a mobile station monitors a paging channel in search of a page message, the mobile station may scan timeslots of the paging channel at a periodic interval defining a slot cycle, and the mobile station may determine whether the paging channel carries a page message indicating the mobile station's identifier. If so, the mobile station may then process the page message as a message destined to the mobile station.

Preferably in each coverage area, the serving base station will broadcast a specification of paging channels defined in the coverage area, so that a mobile station beginning to operate in the coverage area can determine how many paging channels the coverage area includes and, if more than one, can determine which paging channel to monitor. By way of example, this specification may be an indication in a system parameters message that the base station broadcasts periodically or repeatedly on an overhead channel. Further, the specification may define the paging channels expressly by particular coding parameters or, as noted above may simply indicate how many paging channels there are, which may inherently define the paging channels if a sequence of possible paging channels exists.

Preferably, all of the coverage areas in a given system will have a primary paging channel, which may be used as the "default" paging channel in the present method. For instance, in an example CDMA system as discussed above, there may be a sequence of possible paging channels, with a sequence of Walsh codes used for spread spectrum modulation to define respective paging channels. In such an arrangement, the primary paging channel may be defined by Walsh code 1 in each coverage area. But each coverage area may then have one or more additional paging channels.

To generalize, coverage area 22 is shown having M paging channels, and coverage area 24 is shown having N paging channels. In practice, the coverage areas may have the same number of paging channels, in which case M would equal N. Alternatively, the coverage areas may have a different number of paging channels, in which case M would not equal N. Preferably, the number N of paging channels in coverage area 24 into which mobile station 26 is moving is greater than one, i.e., there are at least two paging channels in coverage area 24. As such, coverage area 24 would include the primary (default) paging channel and at least one additional paging channel. On the other hand, the number M of paging channels in coverage area 22, may be one or more, and so coverage area 22 would include the primary paging channel and may include one or more additional paging channels.

For purposes of paging in a coverage area that includes more than one paging channel, the serving RAN (e.g., the serving base station) and each served mobile station are preferably programmed to apply a common hashing algorithm to determine which paging channel will be used. In particular, when the RAN has a page message to send to mobile station in a coverage area that defines more than one paging channel, the RAN will apply the hashing algorithm with respect to the mobile station's identifier to produce a result that will indicate which paging channel is to be used, and the RAN will then transmit the page message to the mobile station on that paging channel. At the same time, when a mobile station is to scan for a page message, the mobile station will apply the same hashing algorithm with respect to its identifier, to produce the same result that will indicate the same paging channel to be used, and the mobile station will then scan that paging channel for an incoming page message.

The hashing algorithm established for use in a given system can take any of a variety of forms, but preferably (although not necessarily) results in a random enough distribution of paging load among the available paging channels in a given coverage area. By way of example, the well known SHA-1 algorithm could be used as the hashing algorithm. Other examples, now known or later developed, may be possible as well.

For purposes of description in this document, the paging channel that would be selected in a given coverage area by applying the established hashing algorithm keyed to the target mobile station's identifier (i.e., the paging channel that would be dictated by the hashing algorithm) may be considered the "ID-hash channel" for that mobile station in that coverage area. In some coverage areas, the mobile station's ID-hash channel may be the primary paging channel, but in other coverage areas, the mobile station's ID-hash channel may be another paging channel.

As further noted above, the present method is especially useful in the context of access handoff, particularly where a mobile station moves from one coverage area to another while the mobile station is seeking to initiate a call (e.g., voice call or data communication session). In the arrangement of FIG. 1, for instance, this may occur if mobile station 26 sends an access probe defining a call origination request to RAN 12 while in coverage area 22 and mobile station 26 moves into coverage area 24 before receiving a response to that access request message. Optimally as noted above, when RAN 12 is going to transmit an access response to mobile station 26, RAN 12 would transmit the response not only in coverage area 22 where RAN 12 receives the access request but also in neighboring coverage area 24, to safeguard for the possibility that mobile station 26 moved to coverage area 24 after sending the access request message. In that scenario, the present method may help to ensure that the mobile station receives the access response message in coverage area 24, as the method may help to avoid communication of the access response message during the time when the mobile station is hashing onto a paging channel in coverage area 24 (e.g., determining how many paging channels exist in coverage area 24 and, if more than one, applying the hashing algorithm to determine which of the paging channels to monitor).

Figure 2:
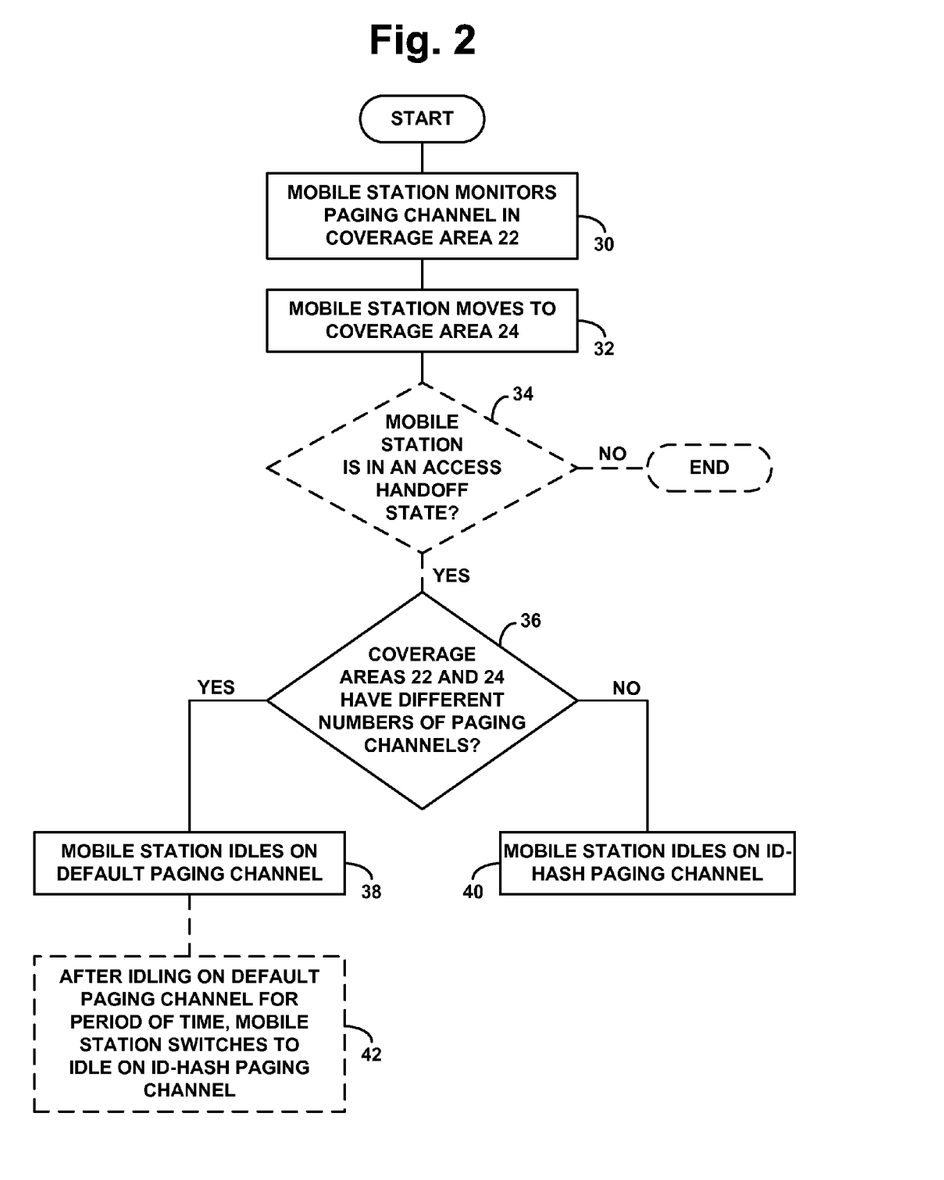
FIG. 2 is a flow chart depicting functions that can be carried out by a mobile station in accordance with the exemplary method.

FIG. 2 is a flow chart depicting how this may occur in practice in accordance with an embodiment of the method. As shown in FIG. 2, at block 30, mobile station 26 operates in coverage area 22, monitoring a paging channel in coverage area 22 in search of any page message destined to the mobile station. If coverage area 22 has more than one paging channel, we can assume that mobile station 26 was monitoring its ID-hash channel in coverage area 22, and that RAN 12 would page mobile station 26 on that ID-hash channel in coverage area 22 if the RAN had a page message to send to the mobile station. For instance, if the mobile station initially powered-on in coverage area 22 or the mobile station moved into coverage area 22 from another coverage area, mobile station 26 may have determined from an overhead channel message how many paging channels are defined in coverage area 22, and mobile station 26 may have then applied the established hashing algorithm keyed to the mobile station's identifier in order to determine which of the paging channels in coverage area 22 to monitor. Mobile station 26 may then "idle" on the selected paging channel in coverage area 22, in that mobile station monitors the selected paging channel to await receipt of a page message (e.g., a page message responding to an access request message from the mobile station, or another page message) from the RAN.

At block 32, mobile 26 then moves from coverage area 22 to coverage area 24. Although mobile station 26 may be in an area of overlap between the coverage areas at this point and may thus be able to communicate with the RAN in both coverage areas, the act of the mobile station moving from one coverage area to another relates to the mobile station switching from monitoring a paging channel in one coverage area to monitoring a paging channel in the other coverage area. Thus, at issue would then be which paging channel mobile station 26 should monitor in coverage area 24 upon moving into coverage area 24.

To help resolve this issue, at block 36, the mobile station will determine whether the number of paging channels in coverage area 36 is different than the number of paging channels in coverage area 22. The mobile station may make this determination in various ways. For example, when mobile station 26 was operating in coverage area 22, the mobile station would likely have determined how many paging channels there were in coverage area 22, and the mobile station may have recorded that number in its memory. When mobile station 26 moves into coverage area 24, the mobile station may then read a system parameters message or the like to determine the number of paging channels in coverage area 24 and may compare that number with the number of paging channels in coverage area 22 that the mobile station recorded in its memory, to determine if the numbers are different. As another example, as noted above, the RAN may have transmitted to mobile station 26 a neighbor list or other such message that included a flag indicating whether coverage area 24 has the same number of paging channels as coverage area 22, and mobile station 26 may thus refer to that indication to determine if the numbers are different.

If mobile station 26 determines at block 36 that the number of paging channels in coverage area 24 is different than the number of paging channels in coverage area 22, then, at block 38, mobile station 26 will select by rote (automatically) the default paging channel, and the mobile station may idle on the default paging channel in coverage area 24. Preferably, the default paging channel thus selected will be different than the mobile station's ID-hash channel in coverage area 24. However, as noted above, it is possible that the mobile station's ID-hash channel could be the same as the default paging channel. An important point is that, when the mobile station faces a situation where the number of paging channels in coverage area 24 is different than the number of paging channels in coverage area 22, the mobile station will automatically operate on the default paging channel (e.g., the primary paging channel) in coverage area 24 without first applying the hashing algorithm to select the paging channel.

On the other hand, if the mobile station determines at block 36 that the number of paging channels in coverage area 24 is the same as the number of paging channels in coverage area 22, then, at block 40, the mobile station may simply select in coverage area 24 the same paging channel that the mobile station was monitoring in coverage area 22, and the mobile station may idle on that selected paging channel in coverage are 24. As noted above, the paging channel thereby selected by rote would likely be the ID-hash channel, assuming the mobile station has applied the hashing algorithm to select the paging channel on which the mobile station idled in coverage area 22.

As further noted above, this method can be especially useful in an access handoff scenario. Indeed, the method can be conditioned on the mobile station being in an access handoff state. This variation is shown by dashed block 34 (which may or may not be optional) in FIG. 2. In particular, upon moving into coverage area 22, mobile station 26 determines at block 34 whether mobile station 26 is in an access handoff state. For instance, mobile station 26 may simply determine if it transmitted an access request message in coverage area 22 and it still awaits receipt of an access response message from the RAN. If so, then mobile station 26 may proceed to block 38 of FIG. 2 as discussed above. Otherwise, the process may end, as the mobile station is not in an access handoff state.

Furthermore, as also noted above, in a scenario where the mobile station applies the above process and thereby opts by rote to idle on the default paging channel when coverage area 24 has a different number of paging channels than coverage area 22, the mobile station may idle on the default paging channel for a particular period of time and may then automatically switch over to idle on the mobile station's ID-hash channel. As explained above, if the network correspondingly pages the mobile station on the ID-hash channel after that particular period of time, then the load balancing function of the hashing algorithm can optimally apply. This switch of paging channels is depicted by dashed block 42 (which may or may not be optional), where, after the mobile station has idled on the default paging channel in coverage area 24 for a particular period of time, the mobile station automatically switches over to idle on its ID-hash channel in coverage area 24. As noted above, the period of time that the mobile station idles on the default paging channel may be a predefined period of time, preferably a time period that is set by engineering design to be sufficient for the mobile station to receive from the RAN a response to an access request message that the mobile station may have sent while in coverage area 22. Alternatively, the period of time may be dynamically extend until the mobile station receives such an access response message, or until the earlier of such receipt and a predefined expiration time. Other arrangements are possible as well.

Figure 3:
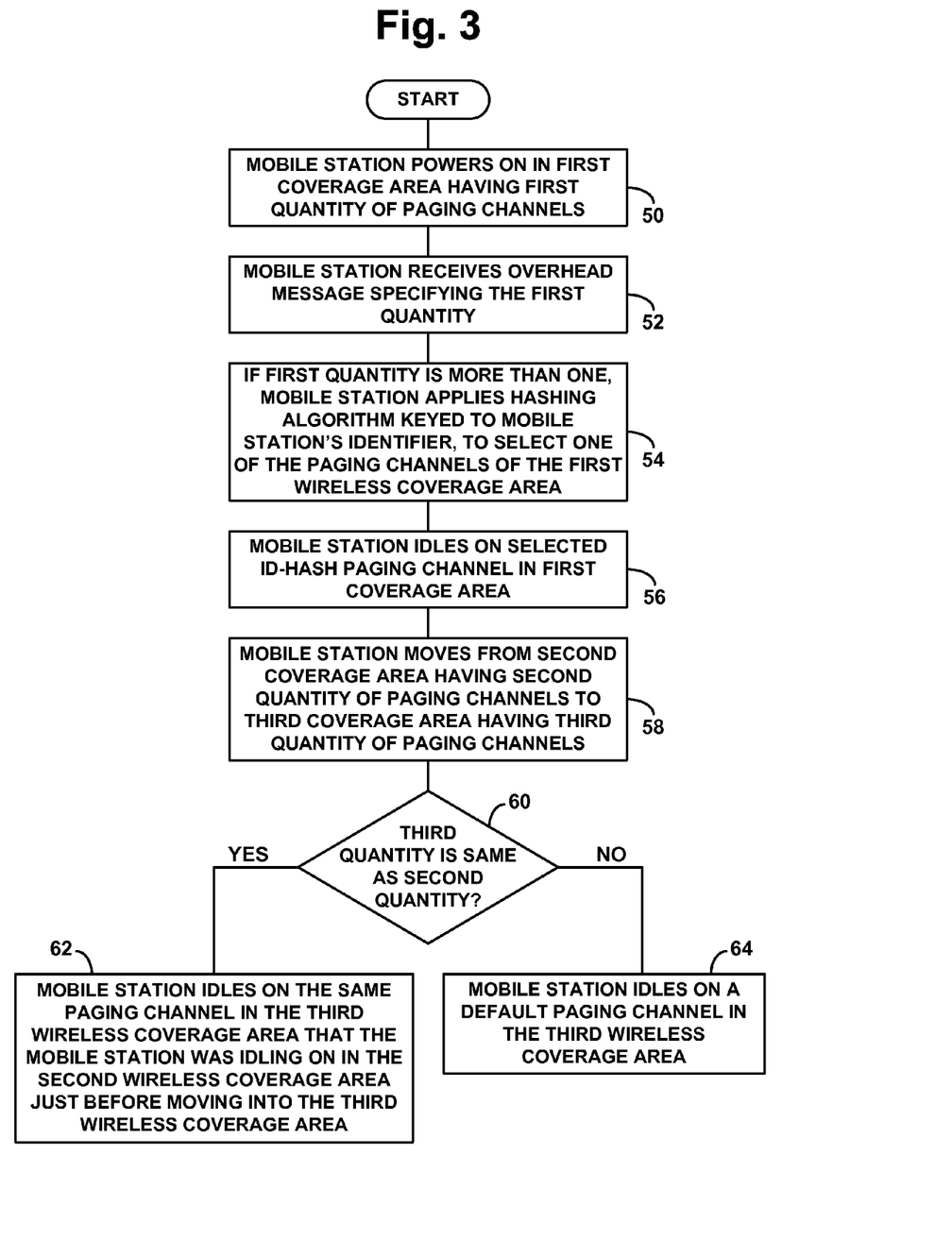
FIG. 3 is another flow chart depicting functions that can be carried out by a mobile station in accordance with the exemplary method.

FIG. 3 is another flow chart depicting functions that can be carried out by a mobile station, such as mobile station 26, in accordance with the present method. As shown in FIG. 3, at block 50, the mobile station may power-on in a first coverage area that has a first quantity of paging channels. At block 52, upon powering-on, the mobile station may then receive from a RAN via the first wireless coverage area an overhead message that specifies the first quantity of paging channels. And at block 54, assuming the first wireless coverage area has more than one paging channel, the mobile station may then apply a hashing algorithm keyed to the mobile station's identifier, to select one of the paging channels of the first wireless coverage area. At block 56, the mobile station may then idle on the selected paging channel of the first wireless coverage area to await receipt of a paging channel message (i.e., a page message) in the first wireless coverage area.

At block 58, while the mobile station is powered-on, the mobile station may then move from a second wireless coverage area that has a second quantity of paging channels into a third wireless coverage area that has a third quantity of paging channels greater than one. At block 60, the mobile station may then make a determination of whether the third quantity is the same as the second quantity. If the determination is that the quantities are the same, then, at block 62, the mobile station may select and idle on the same paging channel in the third wireless coverage area that the mobile station was idling on in the second wireless coverage area just before moving into the third wireless coverage area. On the other hand, if the determination is that the quantities are different, then, at block 64, the mobile station may select by rote and idles on a default paging channel in the third wireless coverage area, i.e., without taking into consideration (in selecting the channel) the mobile station's identifier and without taking into consideration which paging channel the mobile station was idling on in the second wireless coverage area just before moving into the third wireless coverage area.

In this process, the default paging channel may be a primary paging channel. Further, the default paging channel is preferably different than the paging channel that the mobile station would have idled on in the third coverage area in a scenario where the determination is that the third quantity is the same as the second quantity.

Furthermore, in this process, the "second" wireless coverage area may be the "first" wireless coverage area and the "first" quantity may be the "second quantity". In that case, the act of the mobile station moving from the second wireless coverage area to the third wireless coverage area may be the mobile station moving from the first wireless coverage area to the third wireless coverage area. With application of the method, the mobile station may thus have powered on in the first wireless coverage area and applied the hashing algorithm to select a paging channel on which to idle in the first wireless coverage area, and the mobile station may then move from the first wireless coverage area to the third wireless coverage area and, in view of the difference in number of paging channels between the two wireless coverage areas, decide by rote to idle on the default paging channel in the third wireless coverage area.

In addition, as discussed above, the method may additionally involve the mobile station idling on the rote-selected default paging channel in the third wireless coverage area for a particular (e.g., predefined) period of time and then automatically switching over to idle in the third wireless coverage area on a paging channel selected based on the hashing algorithm keyed to the mobile station's identifier.

Figure 4:
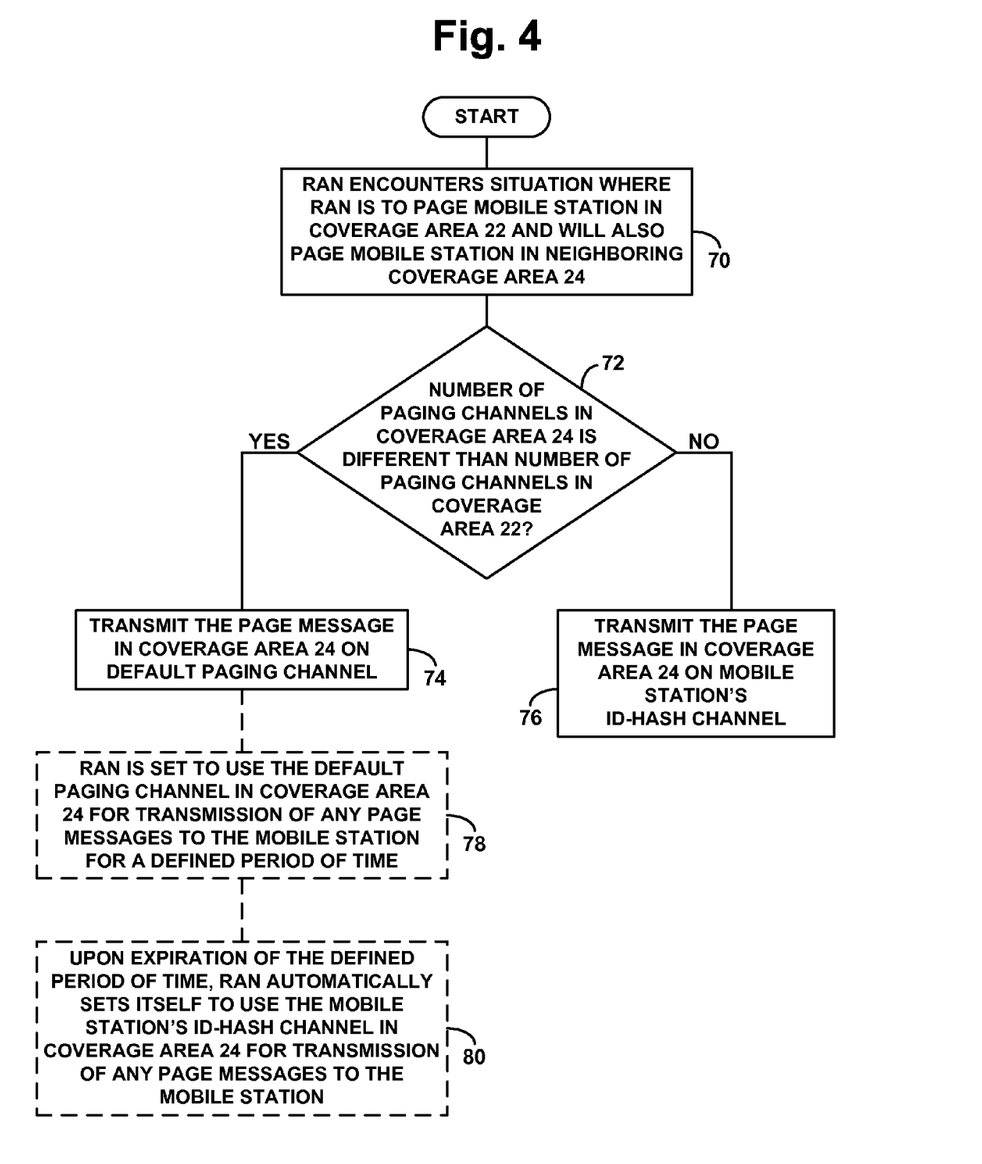
FIG. 4 is a flow chart depicting functions that can be carried out by a RAN in accordance with the exemplary method.

FIG. 4 is next a flow chart depicting functions that can be carried out by RAN (e.g., a base station 16) in accordance with the exemplary method. As shown in FIG. 4, at block 70, the RAN encounters a situation where the RAN is to page the mobile station in a given coverage area such as coverage area 22. To safeguard for the possibility that mobile station has moved from coverage area 22 to coverage area 24, however, the RAN may also page the mobile station in coverage area 24. The assumption in this situation is that coverage area 24 has more than one paging channel. Thus, at issue is which paging channel the RAN should use to page the mobile station in coverage area 24.

To help resolve this issue, at block 72, the RAN will determine whether the number of paging channels in coverage area 24 is different than the number of paging channels in coverage area 22. If the determination is that the number of paging channels in coverage area 24 is different than the number of paging channels in coverage area 22, then, at block 74, the RAN may select and use the default (e.g., primary) paging channel in coverage area 24, preferably where the default paging channel is different than the mobile station's ID-hash channel. On the other hand, if the determination is that the number of paging channels in coverage area 24 is the same as the number of paging channels in coverage area 22, then, at block 76, the RAN may select and use the mobile station's ID-hash channel in coverage area 24.

Figure 5:
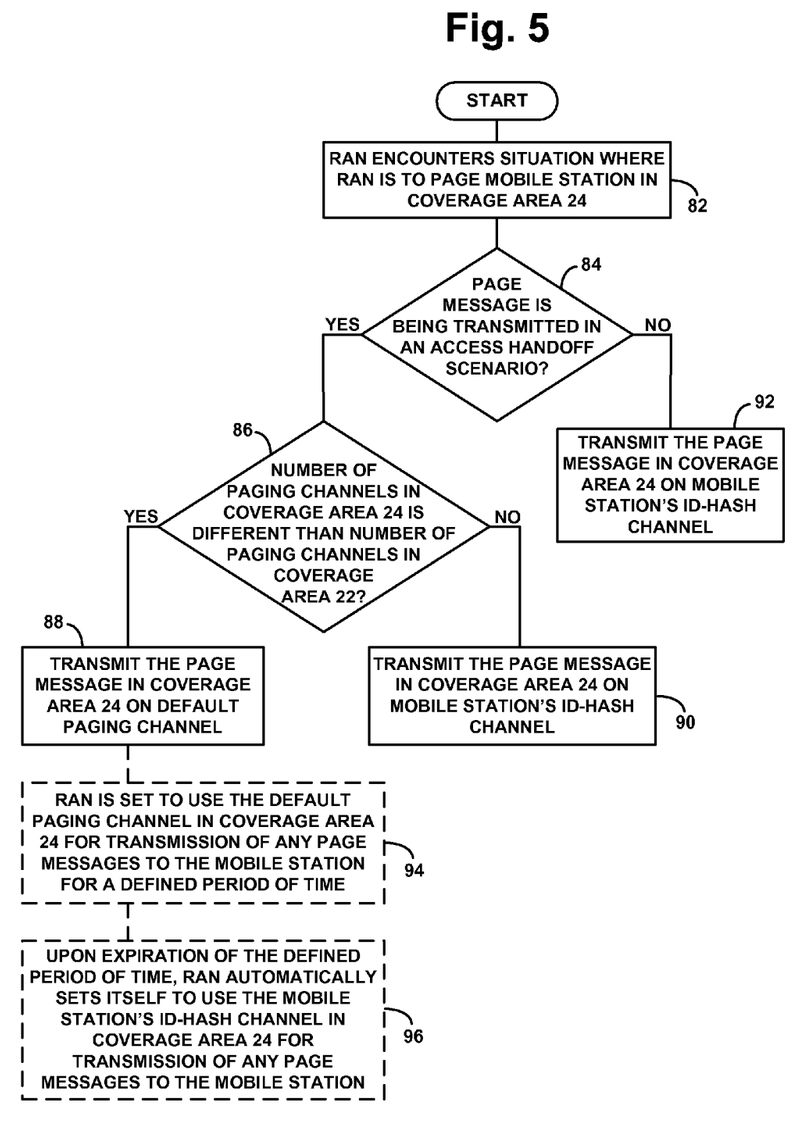
FIG. 5 is another flow chart depicting functions that can be carried out by a RAN in accordance with the exemplary method.

As with the mobile station method above, this process implemented by the RAN can be limited to an access handoff scenario. This variation is illustrated by FIG. 5. As shown in FIG. 5, at block 82, the RAN encounters a situation where the RAN is to transmit a page message to the mobile station in coverage area 24. At block 84, the RAN then determines whether the page message is being transmitted to the mobile station in an access handoff scenario. In particular, the RAN determines whether the page message is an access response message and is a response to an access request message that the RAN received from the mobile station in a different coverage area.

In practice, for instance, this function may be carried out by a base station 16 that serves coverage area 24, when the base station receives from a BSC 18 or other RAN infrastructure a directive to transmit the page message to the mobile station in coverage area 24. Upon receipt of that directive, the base station 16 may read the header information (e.g., a message type indicator) in the page message that indicates whether the page message is an access response message (e.g., a channel assignment message). Further, the base station 16 may consult its memory to determine whether the base station received the corresponding access request message from the mobile station in the same coverage area 24.

If the RAN thereby determines that the page message being transmitted to the mobile station is an access response message and is a response to an access request message that the RAN received from the mobile station in a different coverage area, then the RAN may conclude that the page message is being transmitted to the mobile station in an access handoff scenario. In that case, the RAN would proceed to apply the above process. In particular, at block 86, the would determine whether the number of paging channels in coverage area 24 is different than the number of paging channels in the coverage area where the RAN received the corresponding access request message, e.g., coverage area 22. If the determination is that the number of paging channels in coverage area 24 is different than the number of paging channels in the coverage area where the RAN received the corresponding access request message, then, at block 88, the RAN would select and use the default paging channel in coverage area 24 to transmit the access response message to the mobile station. On the other hand, if the determination is that the number of paging channels in coverage area 24 is the same as the number of paging channels in the coverage area where the RAN received the access request message, then, at block 90, the RAN may select and use the mobile station's ID-hash channel in coverage area 24 to transmit the access response message to the mobile station.

On the other hand, if the RAN determines at block 84 that the page message being transmitted to the mobile station is not being transmitted in an access handoff scenario, then the RAN may forego carrying out the above process. Instead, at block 92, the RAN may simply select and use the mobile station's ID-hash channel to transmit the page message to the mobile station in coverage area 24, or the RAN may take some other measure.

Figure 6:
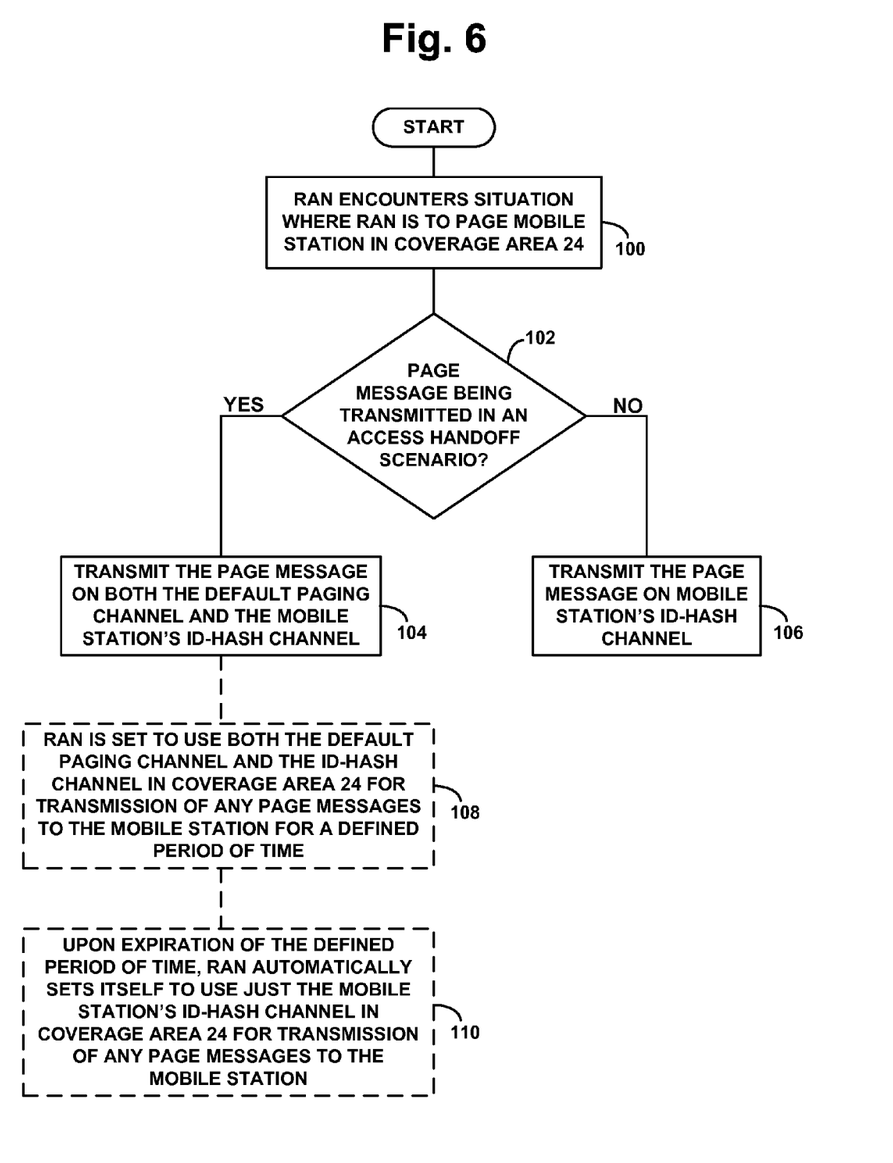
FIG. 6 is another flow chart depicting functions that can be carried out by a RAN in accordance with the exemplary method.

As also discussed above, in an access handoff scenario (or for that matter in some other scenario), the RAN may advantageously transmit a page message to the mobile station in a given coverage area on both the default paging channel (different than the mobile station's ID-hash channel) and the mobile station's ID-hash channel. FIG. 6 illustrates this process by way of example.

As shown in FIG. 6, at block 100, the RAN encounters a situation where the RAN is to transmit a page message to the mobile station in coverage area 24. At block 102, the RAN then determines whether the page message is being transmitted to the mobile station in an access handoff scenario. In particular, the RAN determines whether the page message is an access response message and is a response to an access request message that the RAN received from the mobile station in a different coverage area.

As discussed above, this function may be carried out by a base station 16 that serves coverage area 24, when the base station receives from a BSC 18 or other RAN infrastructure a directive to transmit the page message to the mobile station in coverage area 24. Upon receipt of that directive, the base station 16 may read the header information (e.g., a message type indicator) in the page message that indicates whether the page message is an access response message (e.g., a channel assignment message). Further, the base station 16 may consult its memory to determine whether the base station received the corresponding access request message from the mobile station in the same coverage area 24.

If the RAN thereby determines that the page message being transmitted to the mobile station is an access response message and is a response to an access request message that the RAN received from the mobile station in a different coverage area, then the RAN may conclude that the page message is being transmitted to the mobile station in an access handoff scenario. In that case, at block 104, the RAN would transmit the page message to the mobile station in coverage area 24 on both the default paging channel (different than the mobile station's ID-hash channel) and the mobile station's ID-hash channel. Advantageously, this should increase the chances of the mobile station receiving the page message, particularly in a scenario where the RAN does not know if the mobile station is monitoring the default paging channel or the ID-hash channel.

On the other hand, if the RAN determines at block 102 that the page message being transmitted to the mobile station in coverage area 24 is not being transmitted in an access handoff scenario (e.g., that the page message is not an access response message or that the RAN received the corresponding access request message in coverage area 24 as well), then, at block 106, the RAN would transmit the page message to the mobile station on the mobile station's ID-hash channel.

Also as with the mobile station method above, the RAN can be set to use the rote-selected default paging channel for a defined period of time and to then switch over to use the mobile station's ID-hash channel. From the RAN's perspective, these settings would be in place for any page messages that the RAN needs to send to the mobile station in coverage area 24. For instance, in an access handoff scenario as discussed above, if the RAN determines that the number of paging channels in coverage area 24 is different than the number of paging channels in the coverage area where the RAN received the corresponding access request message, then the RAN may set itself to use the default paging channel for transmission of any page messages to the mobile station for a period of time, and the RAN may then automatically re-set itself to use the mobile station's ID-hash channel for transmission of any page messages to the mobile station after that period of time.

This variation is depicted by the dashed boxes in FIGS. 4-6. In particular, in FIG. 4, at block 78 (following block 74), the RAN may be set to use the default paging channel in coverage area 24 for transmission of any page messages to the mobile station for a defined period of time, and at block 80 the RAN may then automatically set itself to use the mobile station's ID-hash channel in coverage area 24 for transmission of any page messages to the mobile station. Likewise, in FIG. 5, at block 94 (following block 88), the RAN may be set to use the default paging channel in coverage area 24 for transmission of any page messages to the mobile station for a defined period of time, and at block 96, the RAN may then automatically set itself to use the mobile station's ID-hash channel in coverage area 24 for transmission of any page messages to the mobile station. Further, in FIG. 6, at block 108 (following block 104), the RAN may be set to use both the default paging channel and the ID-hash channel in coverage area 24 for transmission of any page messages to the mobile station for a defined period of time, and, at block 110, the RAN may then automatically set itself to use just the mobile station's ID-hash channel in coverage area 24 for transmission of any page messages to the mobile station.

Figure 7:
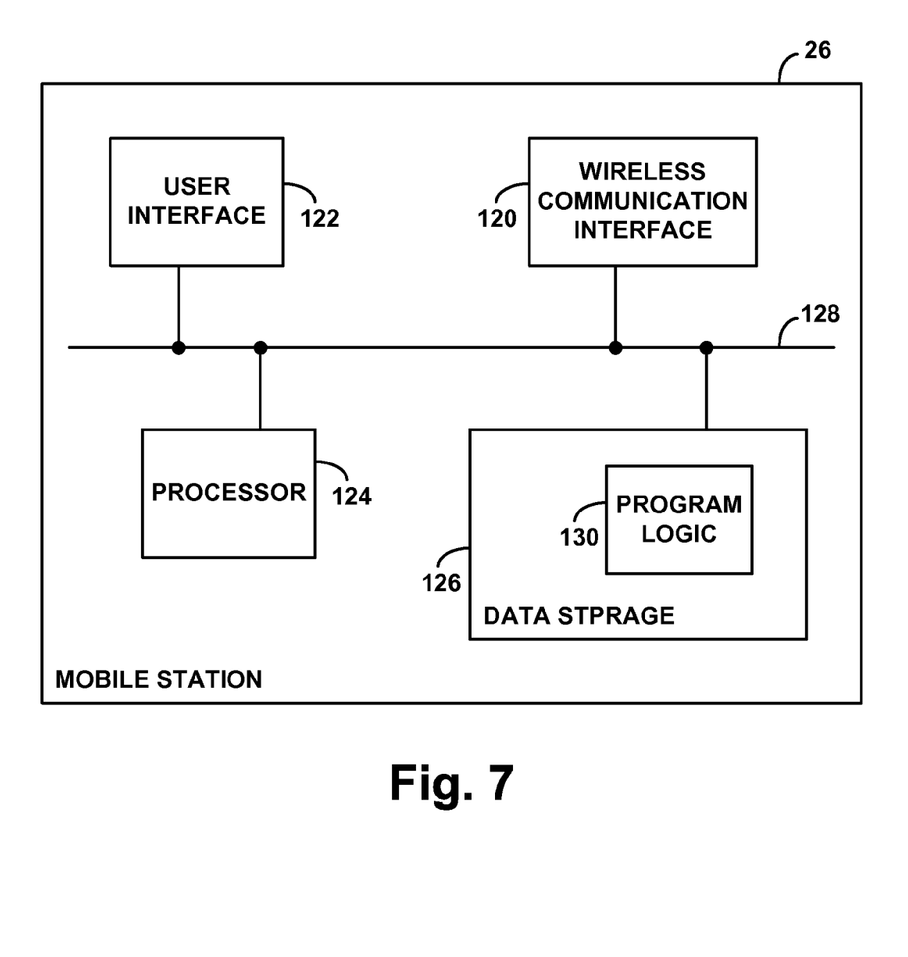
FIG. 7 is a simplified block diagram of a mobile station operable in the exemplary method.

FIG. 7 is next a simplified block diagram of an exemplary mobile station 26, showing functional components that can be included in such a device. As shown, the exemplary mobile station includes a wireless communication interface 120, a user interface 122, a processor 124, and data storage 126, all of which may be communicatively linked together by a system bus, network, or other connection mechanism 128. The mobile station may take other forms as well.

Wireless communication interface 120 (including an antenna, not shown) functions to facilitate air interface communication with RAN 12 according to one or more protocols such as those noted above. User interface 122 includes components for receiving input from a user of mobile station and providing output to a user of the mobile station. Processor 124 may comprise one or more processors (e.g., general purpose and/or special purpose processors), such as microprocessors for instance. And data storage 126 may comprise one or more volatile and/or non-volatile storage components, such as magnetic, optical, or organic storage components, and may be integrated in whole or in part with processor 124. As further shown, data storage 126 preferably contains program logic (e.g., machine language instructions) 130 executable by processor 124 to carry out various mobile station functions described herein.

Figure 8:
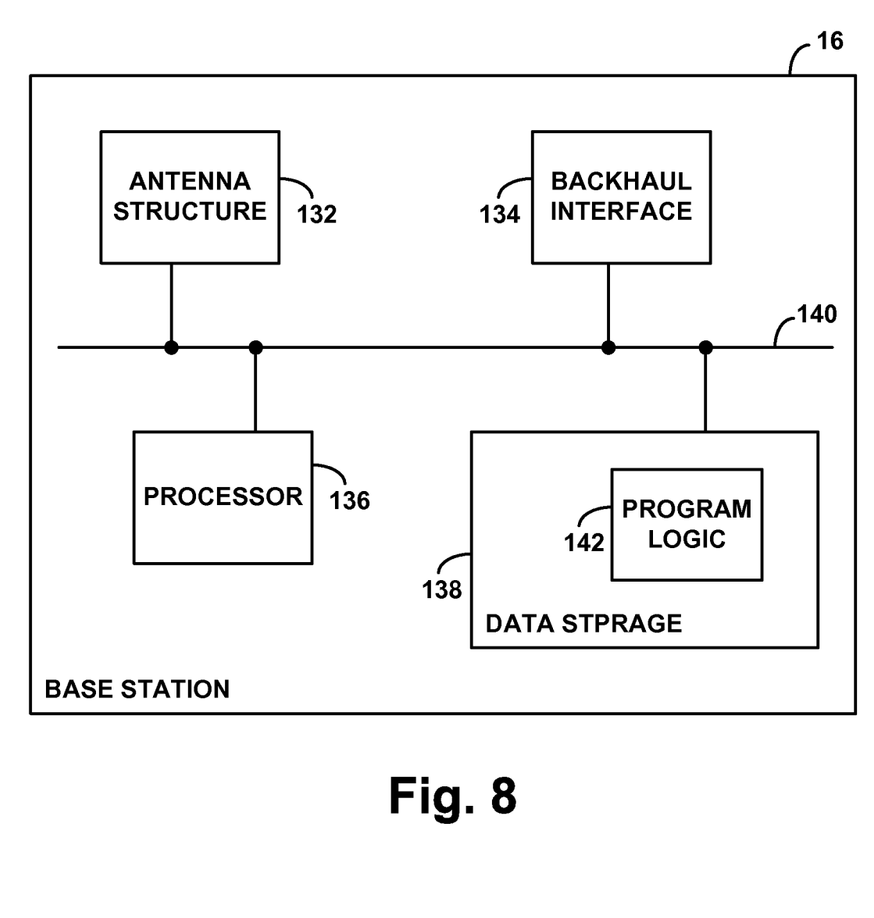
FIG. 8 is a simplified block diagram of a base station operable in the exemplary method.

FIG. 8 is next a simplified block diagram of an exemplary base station 16, showing functional components that can be included in such a device. As shown, the exemplary base station 16 includes an antenna structure 132, a backhaul interface 134, a processor 136, and data storage 138, all of which may be communicatively linked together by a system bus, network, or other connection mechanism 140. The base station may take other forms as well. Further, the base station may be a macro network base station, a femtocell base station, or any other type of base station now known or later developed.

Antenna structure 132 (including a power amplifier, not shown), functions to facilitate air interface communication with served mobile stations, such as mobile station 26, according to one or more protocols such as those noted above. Backhaul interface 134 functions to provide a connection with other RAN infrastructure, such as with a BSC 18 for instance. As such, backhaul interface 134 may include a network interface module arranged to couple with or provide a wired or wireless backhaul connection. Processor 136 may comprise one or more processors (e.g., general purpose and/or special purpose processors), such as microprocessors for instance. And data storage 138 may comprise one or more volatile and/or non-volatile storage components, such as magnetic, optical, or organic storage components, and may be integrated in whole or in part with processor 136. As further shown, data storage 138 preferably contains program logic (e.g., machine language instructions) 142 executable by processor 136 to carry out various RAN functions (e.g., base station functions) described herein.

Exemplary embodiment of the present invention has been described above. Those of ordinary skill in the art will appreciate, however, that numerous changes may be made from the embodiments described without deviating from the scope of the invention as defined by the claims.

We claim:

1. In a radio access network (RAN) that radiates to define a first wireless coverage area and a second wireless coverage area neighboring the first wireless coverage area, wherein the RAN defines a first number of paging channels in the first wireless coverage area and the RAN defines a second number of paging channels in the second wireless coverage area, at least the second number being greater than one, a method comprising:
    (a) the RAN encountering a situation where the RAN is to transmit a page message in the second wireless coverage area to a mobile station;
    (b) the RAN making a determination of whether the second number of paging channels is the same as the first number of paging channels;
    (c) if the determination is that the second number of paging channels is the same as the first number of paging channels, then the RAN transmitting the page message to the mobile station in the second coverage area on a paging channel selected based on an identifier of the mobile station ("ID-hash channel"); and
    (d) if the determination is that the second number of paging channels is different than the first number of paging channels, then the RAN transmitting the page message to the mobile station in the second coverage area on a default paging channel selected without consideration of an identifier of the mobile station.

2. The method of claim 1, further comprising:
    if the determination is that the second number of paging channels is different than the first number of paging channels, then (i) the RAN being set for a particular period of time to use the default paging channel for transmission of any page messages to the mobile station in the second coverage area, and (ii) after expiration of the period of time, the RAN automatically switching to be set to use the ID-hash channel for transmission of any page messages to the mobile station in the second coverage area.

3. The method of claim 1, implemented by a base station.

4. The method of claim 1, further comprising:
    conditioning performance of elements b, c, and d on the mobile station being in an access handoff situation.

5. The method of claim 4, wherein conditioning performance of elements b, c, and d on the mobile station being in an access handoff situation comprises:
    the RAN determining whether the RAN received in the second coverage area from the mobile station an access request message corresponding with page message to be transmitted to the mobile station in the second coverage area;
    if the RAN thereby determines that the RAN received in the second coverage area from the mobile station an access request message corresponding with the page message to be transmitted to the mobile station in the second coverage area, then the RAN concluding that the mobile station is not in an access handoff situation; and
    if the RAN thereby determines that the RAN did not receive in the second coverage area from the mobile station an access request message corresponding with the page message to be transmitted to the mobile station in the second coverage area, then the RAN concluding that the mobile station is in an access handoff situation.

6. The method of claim 5, implemented by a base station of the RAN.

7. The method of claim 6, wherein determining whether the RAN received in the second coverage area from the mobile station an access request message corresponding with page message to be transmitted to the mobile station in the second coverage area comprises:
    the base station determining whether the page message is an access response message; and
    the base station determining whether the base station received from the mobile station in the second coverage area an access request message corresponding with the access response message.

8. The method of claim 1, wherein the default paging channel is a primary paging channel.

\* \* \* \* \*